US006837054B2

(12) United States Patent
Brocard et al.

(10) Patent No.: US 6,837,054 B2
(45) Date of Patent: Jan. 4, 2005

(54) ACTUATOR ASSEMBLY WITH SYNCHRONIZED HYDRAULIC ACTUATORS

(75) Inventors: Jean-Marie Brocard, Rubelles (FR); Daniel Kettler, Chartrettes (FR); Alain Lavie, Yerres (FR); Marion Michau, Vincennes (FR)

(73) Assignee: Hispano-Suiza, Colombes (FR)

( * ) Notice: Subject to any disclaimer, the term of this patent is extended or adjusted under 35 U.S.C. 154(b) by 107 days.

(21) Appl. No.: 10/349,031

(22) Filed: Jan. 23, 2003

(65) Prior Publication Data

US 2003/0136129 A1 Jul. 24, 2003

(30) Foreign Application Priority Data

Jan. 24, 2002 (FR) .......................................... 0200861

(51) Int. Cl.[7] .......................................... F02K 1/15
(52) U.S. Cl. .......................................... 60/771
(58) Field of Search .......................... 60/771, 226.2

(56) References Cited

U.S. PATENT DOCUMENTS 2,657,539 A 11/1953 Geyer
2,886,008 A 5/1959 Geyer
3,515,033 A 6/1970 Geyer
4,391,409 A * 7/1983 Scholz .................. 239/265.29
5,609,020 A * 3/1997 Jackson et al. ............ 60/226.2
5,685,141 A * 11/1997 Markstein et al. ............ 60/204
5,706,649 A * 1/1998 Robinson et al. .......... 60/226.2
6,598,386 B2 * 7/2003 Johnson et al. ............ 60/226.2

FOREIGN PATENT DOCUMENTS

FR 2756329 5/1998

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

The actuator assembly comprises a master actuator and at least one slave actuator having a cylinder containing a piston defining two chambers in the cylinder. A first chamber of the slave actuator is connected to an outlet of a directional control valve which is connected to a hydraulic control circuit and to a control member whose position determines the pressure in the first chamber of the slave actuator. A displacement of the piston of the master actuator is transferred to the control member of the control valve associated with the slave actuator by means of a mechanical transmission such as a flexible linear rolling bearing. Thus, the displacement of the piston of the slave actuator is servo-controlled to the displacement of the piston of the master actuator by controlling the position of the control member of the control valve associated with the slave actuator. The actuator assembly is suitable for use in particular for controlling the moving flaps of the nozzle of a turbojet of variable exhaust section, and possibly also steerable.

13 Claims, 7 Drawing Sheets

ACTUATOR ASSEMBLY WITH SYNCHRONIZED HYDRAULIC ACTUATORS

BACKGROUND OF THE INVENTION

The invention relates to synchronizing hydraulic actuators and has a particular application in simultaneously actuating the moving flaps of variable exhaust section nozzles of turbojets. Nevertheless, the invention can be used in other applications, for example for actuating a control ring for controlling variable-angle blades in a stator for a gas turbine compressor.

In a known embodiment of a variable section nozzle, the moving flaps are actuated by means of a set of hydraulic actuators acting on controlled flaps which in turn entrain follower flaps. The controlled flaps are actuated by links hinged to the rods of the actuators or to a common control ring on which the actuators act. Mechanical means ensure that the controlled flaps are synchronized independently of the follower flaps which are not synchronized. Such a nozzle, whose mechanical design ensures that it is self-synchronizing, presents drawbacks in terms of cost and mass and because of the presence of parts that are caused to rub against one another while hot.

Another solution consists in controlling the set of flaps synchronously in order to avoid friction or even jamming between flaps, which requires increased actuator force and can lead to damage that affects the lifetime of the flaps, with the synchronization function being taken over by the actuators.

Unfortunately, because of inevitable dispersion in characteristics, it is known that it is not possible in practice to achieve simultaneous displacement of actuator rods, even when the actuators are controlled from a common hydraulic fluid manifold.

In order to solve that problem, proposals are made in document FR 96/14565 to implement a mechanical connection between the pistons of the actuators by means of a toothed ring which meshes with gearwheels, each coupled to an actuator piston by a screw-and-nut system which transforms the translation movement of the piston into rotary movement of the gearwheel.

Such a synchronizing device does indeed make it possible to ensure that the pistons of the actuators are displaced simultaneously, but it requires a toothed ring that is capable of transmitting the forces needed to overcome the differences in displacement between pistons, and thus a ring that is relatively massive and bulky.

OBJECT AND SUMMARY OF THE INVENTION

An object of the invention is to provide an actuator assembly with synchronized hydraulic actuators that does not present such a drawback.

This object is achieved by an assembly comprising:

a hydraulic control circuit;

a master actuator having a cylinder and a piston defining two chambers inside the cylinder that are connected to the hydraulic circuit;

at least one slave actuator having a cylinder and a piston defining two chambers in the cylinder, at least a first one of which is connected to an outlet of a directional control valve, which control valve is connected to the hydraulic circuit and to a control member whose position determines the pressure in the first chamber of the slave actuator; and a mechanical transmission for transmitting a displacement of the piston of the master actuator to the control member of the control valve associated with the slave actuator in such a manner that the displacement of the piston of the slave actuator is servo-controlled to the displacement of the piston of the master actuator by controlling the position of the control member of the control valve associated with the slave actuator.

As a result, at the or each slave actuator, the reference position for the piston of the master actuator, as transmitted mechanically, is applied not directly to the piston of the slave actuator, but to a control valve associated with the slave actuator and acting as a hydraulic amplifier of the mechanical reference signal. The displacement of the piston of the master actuator can thus be transmitted mechanically by means that are light in weight.

According to a feature of the actuator assembly, the mechanical transmission comprises a device for converting displacement in translation of the piston of the master actuator into rotary movement of a master gearwheel, a device for transmitting the rotary movement of the master gearwheel to a slave gearwheel, and a device for converting the rotary movement of the slave gearwheel into displacement in translation of a control rod of the control valve associated with the or each slave actuator.

Advantageously, the device for converting the rotary movement of the slave gearwheel into displacement in translation of the control rod is formed by a first screw-and-nut system in which the screw is carried by the control rod. A second screw-and-nut system is then provided to include a second screw-and-nut system for converting a displacement in translation of the piston of the slave actuator acting as a nut into a rotary movement of the screw of the second screw-and-nut system, the control rod and the screw of the second screw-and-nut system being screwed together in such a manner that rotary movements of the control rod and of the screw compensate, and the control rod remains stationary in translation so long as the displacement of the piston of the master actuator transmitted to the control rod and the displacement of the piston of the slave actuator are synchronized.

The device for transmitting rotary movement from the master gearwheel to the slave gearwheel is constituted, for example, by a flexible linear rolling bearing carrying racks that mesh with the gearwheels.

The or each slave actuator may have a first chamber connected to the control valve associated with said slave actuator and a second chamber connected in common with a chamber of the master actuator.

In a variant, the or each slave actuator may be associated with a two-outlet control valve connected to the first and to the second chambers of the slave actuator.

When the pistons of the actuators are connected to a common control ring, the actuator assembly preferably has one master actuator and two slave actuators. If at least one additional actuator is needed, then the additional actuator may be a follower actuator connected to the hydraulic circuit in parallel with the master actuator, the presence of one master actuator and of two slave actuators being sufficient to ensure the desired synchronization.

BRIEF DESCRIPTION OF THE DRAWINGS the invention will be better understood on reading the following description given by way of non-limiting indication and with reference to the accompanying drawings, in which.

DETAILED DESCRIPTION OF AN EMBODIMENT

In the description below, reference is made to an actuator assembly for moving flaps such as the nozzle flaps of a turbojet having a variable gas exhaust section.

Figure 1:
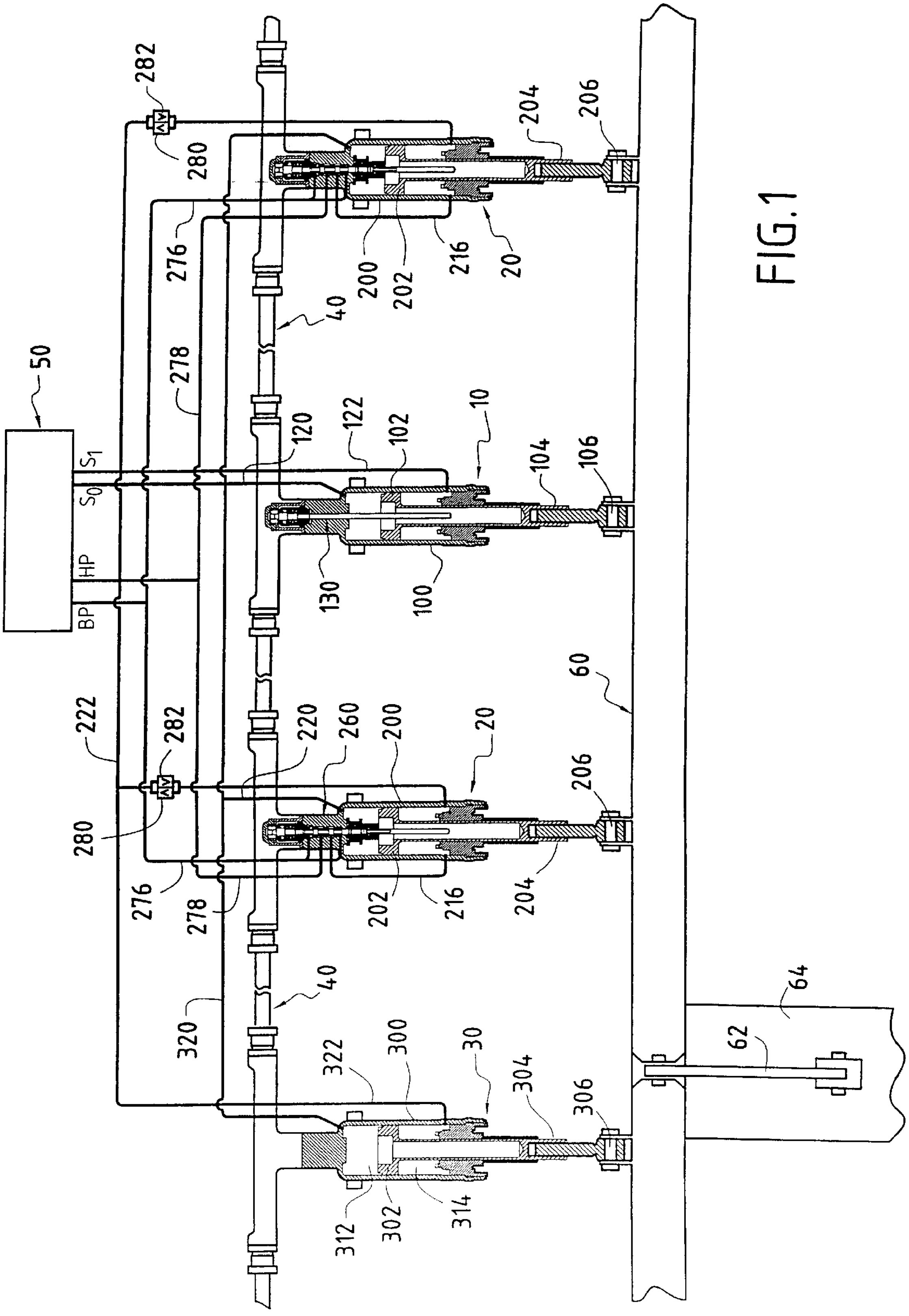
FIG. 1 is a developed diagrammatic view of an embodiment of an actuator assembly in accordance with the invention for actuating the flaps of a variable section nozzle.

FIG. 1 shows an actuator assembly in accordance with the invention comprising a master actuator 10, two slave actuators 20, a follower actuator 30, a mechanical transmission device 40 between the master actuator and the slave actuators, and a hydraulic circuit 50 for nozzle control.

In the example shown, the actuators 10, 20, and 30 act on a control ring 60 having links 62 hinged thereto connecting the control ring 60 to moving nozzle flaps 64 (only one link 62 and only one flap 64 are shown in FIG. 1 which is a flat developed view of the actuator assembly and of the control ring).

The total number of actuators is preferably selected to be not less than three in order to constitute an assembly in static equilibrium. When three actuators are used, one acts as a master actuator and the other two act as slave actuators whose displacements are servo-controlled to the displacement of the master actuator. If more than three actuators are provided, for the purpose of producing the forces that are required for displacing the ring without requiring undesirable overdimensioning of the actuators, then the additional actuator(s) may be implemented as follower actuator(s) (a single additional actuator is shown in the embodiment of FIG. 1) powered by the hydraulic control circuit in parallel with the master actuator, insofar as the desired synchronization can be ensured by means of the master actuator and the two slave actuators.

It should be observed that the actuator assembly of the invention may be used without a control ring, the actuators being connected by respective links directly to the flaps or other moving members that are to be moved synchronously.

Figure 2:
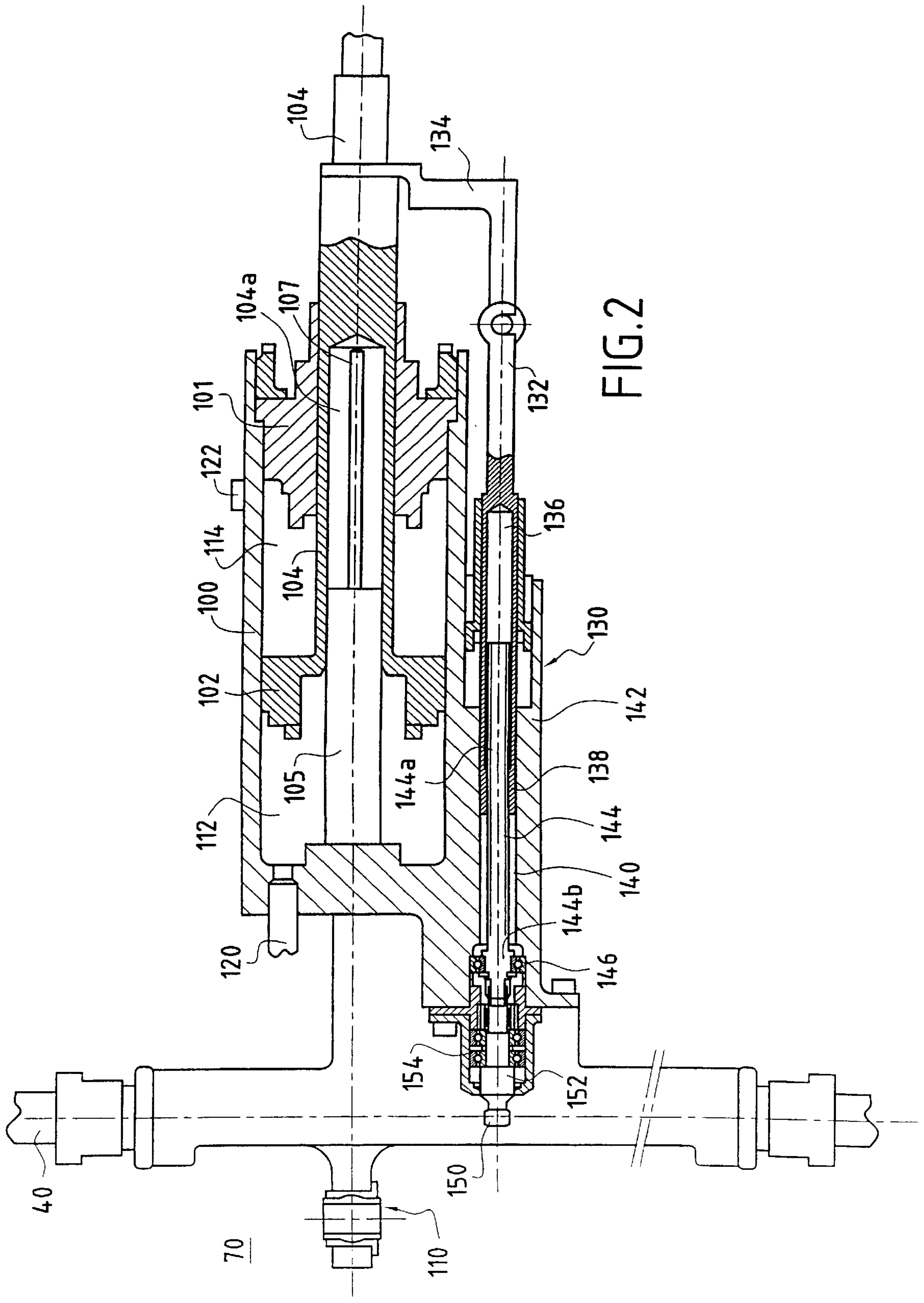
FIG. 2 is a fragmentary section view of an embodiment of a master actuator for an actuator assembly in accordance with the invention.

In the embodiment shown in greater detail in FIGS. 1 and 2, the master actuator 10 comprises a cylinder 100 having a piston 102 that is axially movable in the cylinder and that is secured to a rod 104 having one end connected to the control ring 60 via a hinge 106. This assembly comprising a rod 104 and a piston 102 is guided in translation by a leaktight bearing 101 closing the cylinder 100. A linear position sensor having a body 105 connected to the cylinder 100 and a rod 107 fixed in a bore 104*a* of the rod 104 serves to measure the position of the rod 104 over the entire stroke of the actuator. The signal provided by this position sensor represents the real position of the moving flaps and is transmitted to a control unit for controlling the configuration of the nozzle. At its rear end remote from its end through which the rod 104 projects, the cylinder 100 is mounted on a wall 70 by means of a hinge 110.

The piston 102 subdivides the inside volume of the cylinder 100 into two chambers 112 and 114. The rear chamber 112 is connected to the hydraulic circuit 50 for controlling the nozzle by a pipe 120, while the front chamber 114 is connected to the circuit 50 via a pipe 122.

A screw-and-nut system 130 transforms the linear translation movement of the piston 102 into rotary movement. In this system, the nut 132 is in the form of a cylindrical rod having one end fixed to a tab 134 that is secured to the piston rod 104. At the other end of the rod 132 there is an opening to a blind axial hole 136 which presents an inside thread 138 over at least a fraction of its length. The rod 132 can slide in a housing 140 formed in a body 142 secured to the body of the cylinder 100, e.g. integrally molded therewith.

The screw 144 of the screw-and-nut system 130 has a threaded end portion 144*a* engaged in the hole 136 in the nut 132. At its other end 144*b* which is not threaded the screw 144 is carried by a bearing 146 fixed in the body 142.

The screw 144 rotates a master gearwheel 150 outside the body 142. The gearwheel 150 can be mounted directly at the end of the screw 144, or as shown in FIG. 2, it can be mounted at the end of a rod 152 constrained to rotate with the screw 144 but free to move in axial translation relative thereto. The rotary connection between the screw 144 and the rod 152 is implemented for example by a square rod or by flats formed in portions of the screw 144 and the rod 152 and having complementary shapes that are engaged mutually. Any other mechanical means enabling rotary movement to be transmitted without jamming between two parts that are not necessarily exactly in alignment could be used. The rod 152 is supported by a bearing 154 received in a cap fixed on the body 142. This disposition makes it easier to mount the master gearwheel 150.

Figure 3:
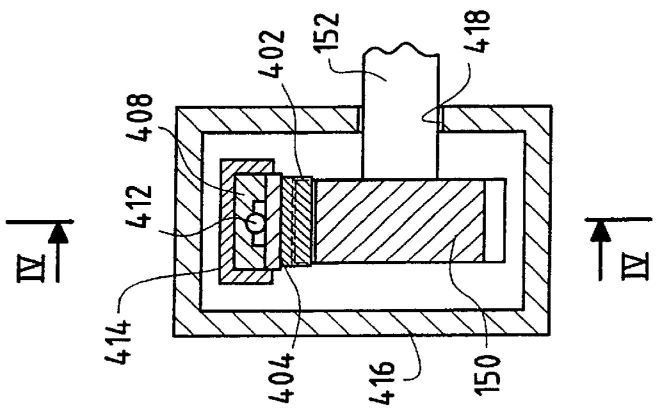
FIG. 3 is a view on a larger scale of a detail of FIG. 2.
Figure 4:
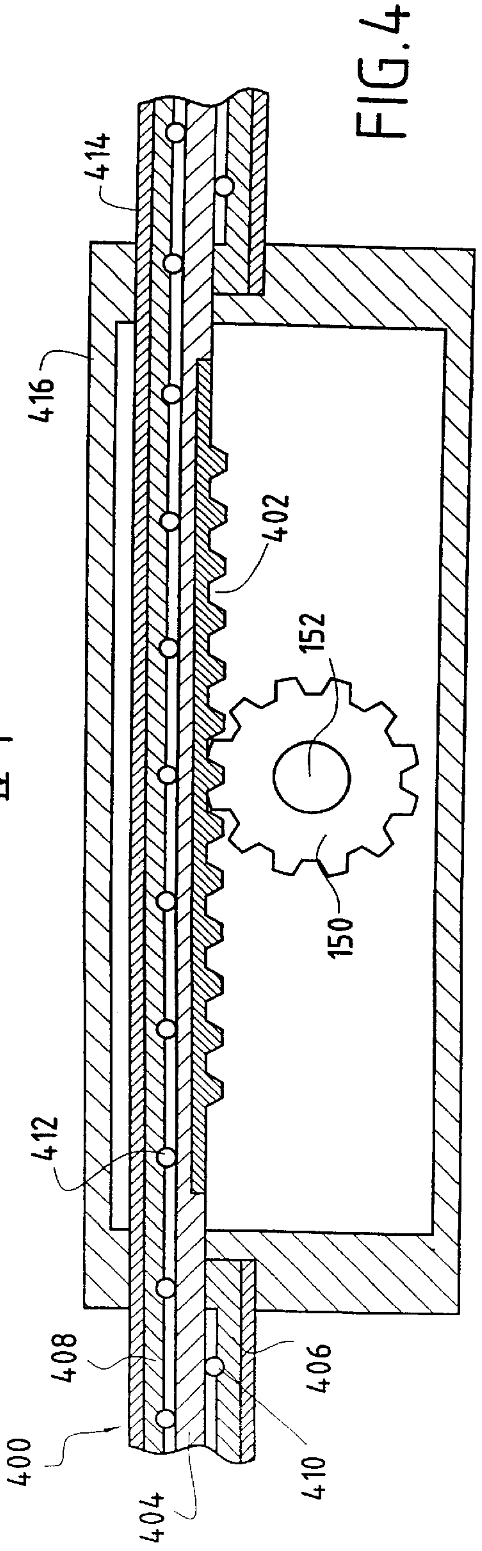
FIG. 4 is a fragmentary section view on plane IV—IV of FIG. 3.

The master gearwheel 150 meshes with a segment of a rack 402 of the mechanical transmission device 40 (see FIGS. 3 and 4).

In the embodiment of FIG. 2, the system 130 for transferring the movement of the piston 102 to the gearwheel 150 is disposed on one side of the cylinder 100.

In a variant, when at least one follower actuator is used, the position sensor 105, 106 can be mounted axially inside the follower actuator, leaving room available to receive the system 130 axially relative to the cylinder 100, as shown diagrammatically in FIG. 1, so that the master actuator 10 can be more compact.

The transmission device 40 is advantageously formed by a flexible linear rolling bearing 400, e.g. of the type sold by the French supplier Intertechnique under the name "Teleflex Syneravia". It comprises a flexible metal core 404 which slides between two strips 406 and 408 with balls or rollers 410, 412 being interposed therebetween, the entire assembly being received in a stationary sheath 414.

At the connection with the master gearwheel 150, the sheath 414 and one of the strips 406 are cut with the cut ends of the strip 406 being folded so as to close the housing for the balls 410. The rack segment 402 is fixed, e.g. welded, to the portion of the core 404 that is thus uncovered so as to ensure that its slides therewith. A protective housing 416 encloses the rack 402, the connection zones with the remainder of the linear rolling bearing 400, and the master gearwheel 150. The housing 416 is fixed to the actuator 10 and to the sheath 414. The rod 152 carrying the gearwheel 150 passes through a bearing 418 carried by the housing 416. In FIG. 4, as in FIG. 1, the transmission device 40 is shown in a flat developed configuration.

Figure 5:
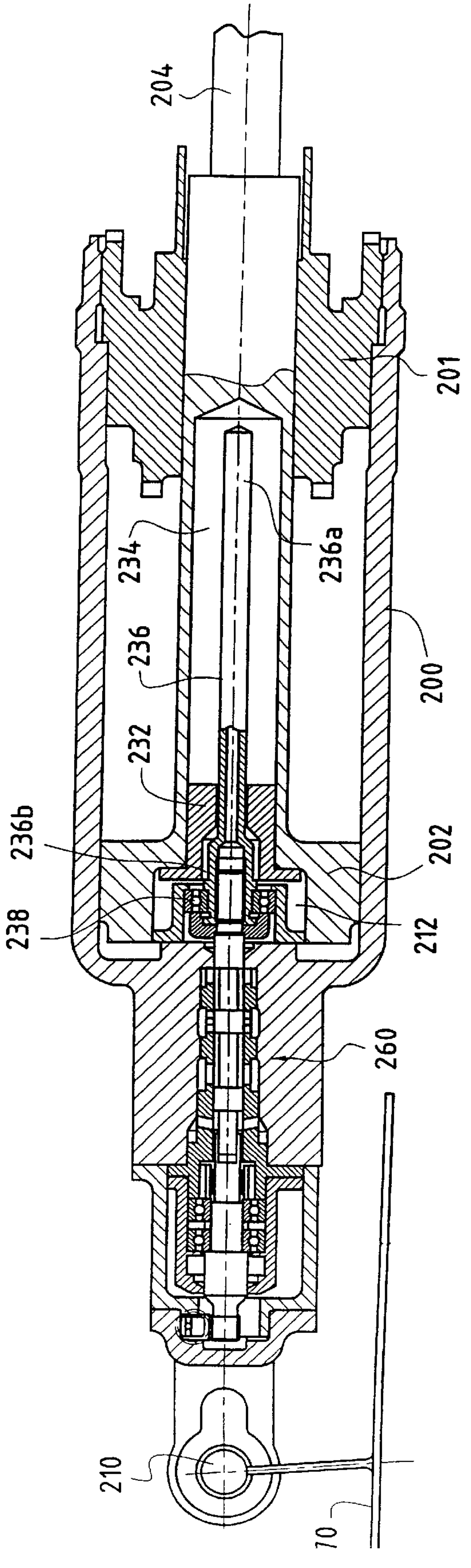
FIG. 5 is a fragmentary section view of a slave actuator of the FIG. 1 assembly.
Figure 6:
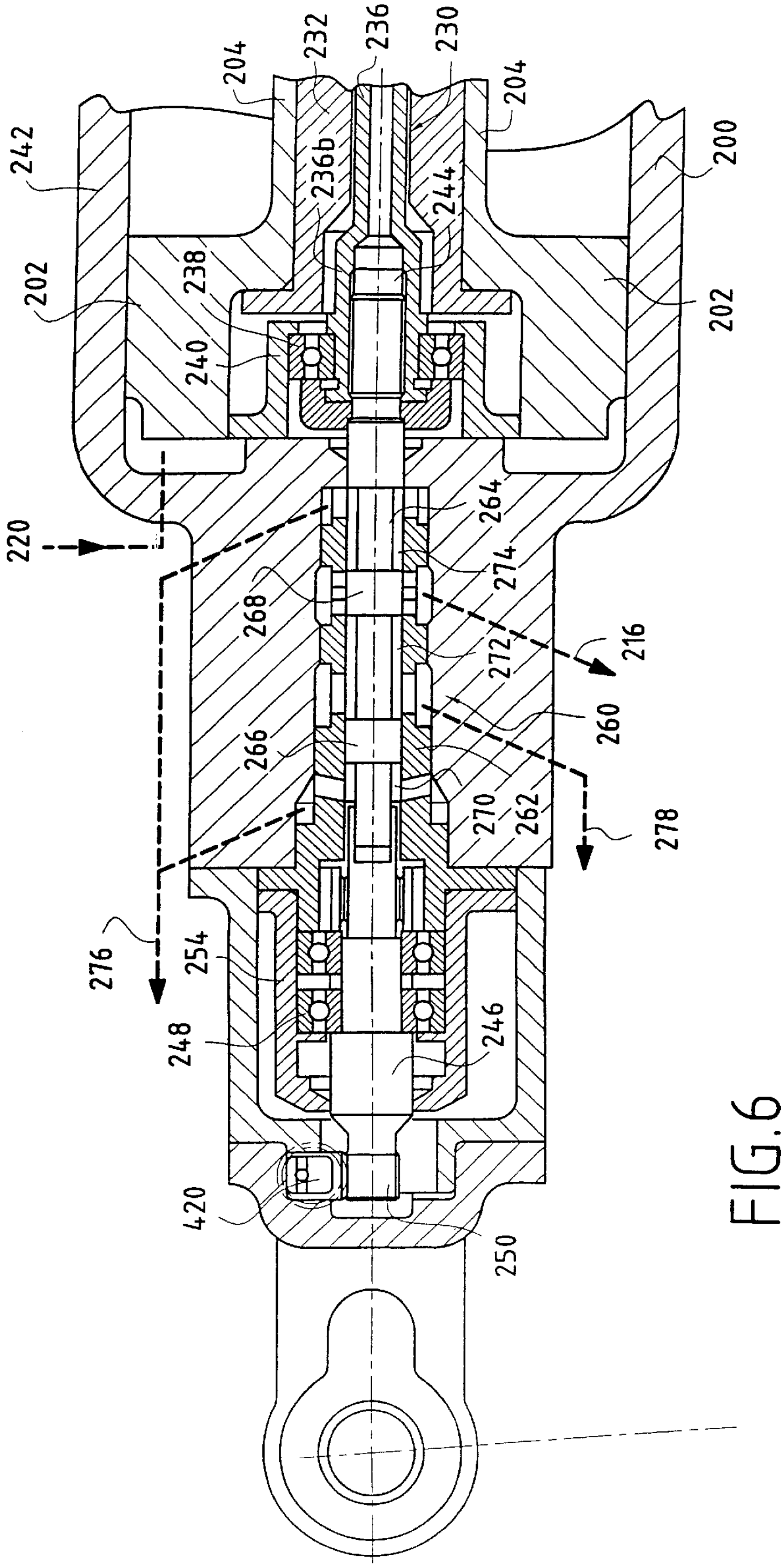
FIG. 6 is a view on a larger scale of a portion of FIG. 5.

Each slave actuator 20 (FIGS. 1, 5, and 6) comprises a cylinder 200 having a piston 202 that is axially movable within the cylinder and that is secured to a rod 204 connected to the control ring 60 via a hinge 206. At its front end, the cylinder 200 is closed by a rod bearing 201 having the rod 204 passing therethrough in leaktight manner. At its rear end opposite from its end through which the rod 204 projects, the cylinder 200 is mounted on the wall 70 via a hinge 210.

The piston 202 subdivides the inside volume of the cylinder 200 into two chambers 212 and 214. The rear chamber 212 is connected to the circuit 50 via a pipe 220, while the front chamber 214 is fed via a directional control valve 260 whose outlet is connected to the chamber 214 via a pipe 216.

The control valve 260 comprises a cylinder 262 having a control rod 264 slidably mounted therein and carrying shoulders 266 and 268 so as to define three chambers 270, 272, and 274. At its ends, the control valve is connected via a pipe 276 to a low pressure hydraulic outlet BP of the circuit 50, whereas its intermediate chamber is connected via a pipe 278 to a high pressure hydraulic outlet HP from the circuit 50 so as to receive pressure that is an image of the pressure that exists in the chamber 114 of the master actuator, which pressure serves as a reference pressure. Depending on the axial position of the control rod 264, the control valve 260 puts the chamber 214 of the actuator into communication either with the pipe 276 or with the pipe 278.

The chamber 214 of the actuator 20 is also connected, via two excess pressure release valves 280 and 282 connected head to tail to a pipe 222 itself connected to the circuit 50. As a result, the pressure in the chamber 214 of the slave actuator cannot depart too far from the pressure in the chamber 114 serving as the reference, and if this were not the case there would be a danger of the nozzle becoming "twisted".

A screw-and-nut system 230 transforms the linear translation movement of the piston 202 into rotary movement. In this system, the nut 232 is secured to the piston rod 204 and is engaged in a blind longitudinal hole 234 formed in the rod 204 and opening out to the rear end thereof. The nut 232 extends over a fraction only of the length of the hole 234 in the vicinity of its opening.

The screw 236 of the screw-and-nut system 230 has a threaded portion **236*a* screwed into the nut 232 and capable of extending into the hole 234. At its non-threaded rear end 236*b*, the screw 236 is carried by a bearing 238 mounted in a bearing support 240 secured to the body 242 of the cylinder 200**.

The screw pitch 232-236 of the screw-and-nut system 230 is identical to the screw pitch 132-144 of the screw-and-nut system 130, and is in the same direction, such that a given displacement in translation of the pistons of the master and slave actuators gives rise to the same displacement in rotation of the screws 144 and 236.

In its end portion **236*b*, the screw 236 has a threaded blind axial hole 244 into which there is screwed a threaded end of the control rod 264 of the control valve 260, such that the rod 264 and the screw 236 constitute another screw-and-nut system in which the nut is formed by the screw 236 of the screw-and-nut system 230. In this other screw-and-nut system 264-236, the screw pitch is in the same direction as in the system 230**.

At its other end, the control rod 264 is constrained to rotate with a rod 246 but is free to move in translation relative thereto. The connection between the control rod 264 and an end of the rod 246 may be implemented via a square section or via flats formed in mutually engaged portions of the rods 264 and 246 that are of complementary shapes. Any other mechanical means enabling rotary movement to be transmitted without jamming between two parts that are not necessarily exactly in alignment could be used. At its other end, the rod 246 carries a slave gearwheel 250. The rod 246 is supported by a bearing 248 received in a cap 254 fixed on the body 252.

The slave gearwheel 250 meshes with a rack segment 420 of the mechanical transmission device. The way in which the rack segment 420 is arranged and the way in which it is connected with the master gearwheel 250 are the same as that described above with reference to the rack segment 404 of the master gearwheel 150.

The follower actuator 30 (FIG. 1) comprises a cylinder 300 having a piston 302 that is axially movable in the cylinder and that is secured to a rod 304 connected to the control ring 60 via a hinge 306. At its end remote from that through which the rod 304 projects, the cylinder 300 is mounted on the wall 70 via a hinge (not shown).

The piston 302 subdivides the inside volume of the cylinder 300 into two chambers 312 and 314. The rear chamber 312 is connected to the circuit 50 via a pipe 320 while the front chamber 314 is connected to the circuit 50 via a pipe 322.

The pipes 120, 220, and 320 are connected in common to an outlet $S_0$ of the circuit 50, while the pipes 122, 222, and 322 are connected in common to another outlet $S_1$ of the circuit 50.

Thus, the master actuator 10 and the follower actuator 30 are fed with hydraulic fluid in parallel. The slave actuators 20 have their chambers 212 fed in parallel with the chambers 112 and 312 of the actuators 10 and 30, but their chambers 214 are fed by the control valves 260.

The operation of the actuator assembly is described below with reference to FIG. 7 which is a circuit diagram for the assembly (omitting the follower actuator 30) together with some of the elements of the circuit 50.

A "nozzle" pump 502 produces high pressure HP for actuating the actuators so as to act on the moving flaps in order to enlarge (open) or reduce (close) the gas exhaust section through the nozzle. Provision is made in this case to use a special pump 502 in order to deliver the level of high pressure that is required since it is considerably greater than the high pressure hp supplied by a high pressure pump 504 of the general hydraulic circuit for the turbojet.

The pressure HP is applied to the outlet $S_0$ or to the outlet $S_1$ by means of a servo-valve 500 which receives the pressure HP on an inlet 512. The outlets 514 and 516 of the servo-valve 500 are connected to the outlet $S_0$ and $S_1$, respectively. A two-stage servo-valve could be used comprising stages **500*a* and 500*b*. The pressure HP is switched by the second stage 500*b* under the control of the first stage 500*a*. This stage has inlets 518 and 520 receiving the pressure hp from the circuit 504 together with low pressure BP supplied by a low pressure pump 522** of the general hydraulic circuit. The first stage is controlled by a single S, for example an electrical signal controlling a hydraulic control valve.

The pressures HP and BP leaving the circuit 50 are applied to the control valves of the slave actuators by the pipes 276 and 278.

The transfer of the pressure HP to the outlet $S_0$ under the control of the signal S causes the nozzle to be opened, for example, with the outlet $S_1$ then being connected to the pressure BP. The high pressure HP is applied in parallel to the chambers 112, 212, and 312 of the actuators 10, 20, and 30, while the chambers 114, 214, and 314 are connected to the pressure BP. The pressures HP and BP are then modulated as a function of the forces transmitted by the nozzle, by means of the servo-valve 500 (to the chambers 112 and 114, 212, 312, and 314) and the control valves 260 (to the chambers 214). The application of low or high pressure HP or BP to the chambers 114, 214 is governed by the difference in position between the master actuator and the slave actuators, i.e. by the error in regulation.

The displacement of the rod 104 of the master actuator is transferred via the screw-and-nut system 130, the master gearwheel 150, the linear rolling bearing 400, and the slave gearwheel 250 of each of the slave actuators 20.

Rotation of the slave gearwheel 250 is transmitted to the control rod 264 of the control valve 260 via the rod 246. Together with the thread in the axial hole 244 of the screw 236, the rod 264 forms a screw-and-nut system transforming rotation of the rod 264 into linear displacement thereof in translation so that the low pressure BP is transmitted to the chamber 214 of the actuator.

When the piston 202 of the actuator 20 is moved, its movement in translation is converted into rotary movement of the screw 236.

Any lack of synchronization in advance of the pistons 102 and 202 gives rise to axial displacement of the control rod 264 which then modulates the pressure applied in the chamber 214 so as to compensate immediately for this lack of synchronization.

The direction in which the shoulder 268 of the control valve 260 acts on the pressure delivered by the pipe 216 is selected to co-operate with the direction of the screw pitch 244 and 236 so that the servo-control feedback acts in the proper direction, given the pressure levels in the pipes 276 and 278.

The screw pitch between the rod 264 and the thread of the hole 244 is selected with reference to the pitch that exists between the screw 236 and the thread of the nut 232 so that when the displacements of the pistons 102 and 202 are synchronized, rotation of the screw 236 forming the feedback screw compensates that of the rod 264 which then remains stationary in translation in a state of equilibrium.

This pitch of the thread 244 may be determined as follows.

The maximum hydraulic gain of the control valve 260 needs to be obtained when the position error between a slave actuator and the master actuator reaches a determined maximum value which is a function in particular of the mechanical capacity of the nozzle to accommodate "distortion" without jamming and without permanently deforming its component parts, and on the ability of the airplane to accommodate off-axis thrust.

On the basis of maximum gain values for the control valve 260, which may represent a maximum stroke of the rod 264 equal to about 1 millimeter (mm), for example, and on the basis of the extent to which lack of synchronization can be accommodated between the actuators, which can be expressed in terms of a percentage of piston stroke, e.g. about 2%, the pitch of the thread 244 can be determined, given that the pitches of the screw-and-nut systems 130 and 230 are imposed by the need for reversibility between the translation and rotary movements they convert.

In addition, a relatively long stroke should be selected for the rack 402, for example several centimeters (cm) so as to reduce the influence of slack or bending in the mechanical transmission 40. This stroke serves to determine the diameter of the gearwheels 150 and 250.

The transfer of high pressure HP to the outlet $S_1$ under the control of the signal S causes the nozzle to be closed, while the outlet $S_0$ is connected to low pressure BP.

The displacements of the pistons of the actuators 10 and 20 are then synchronized in a manner that is analogous to that described above.

Figure 7:
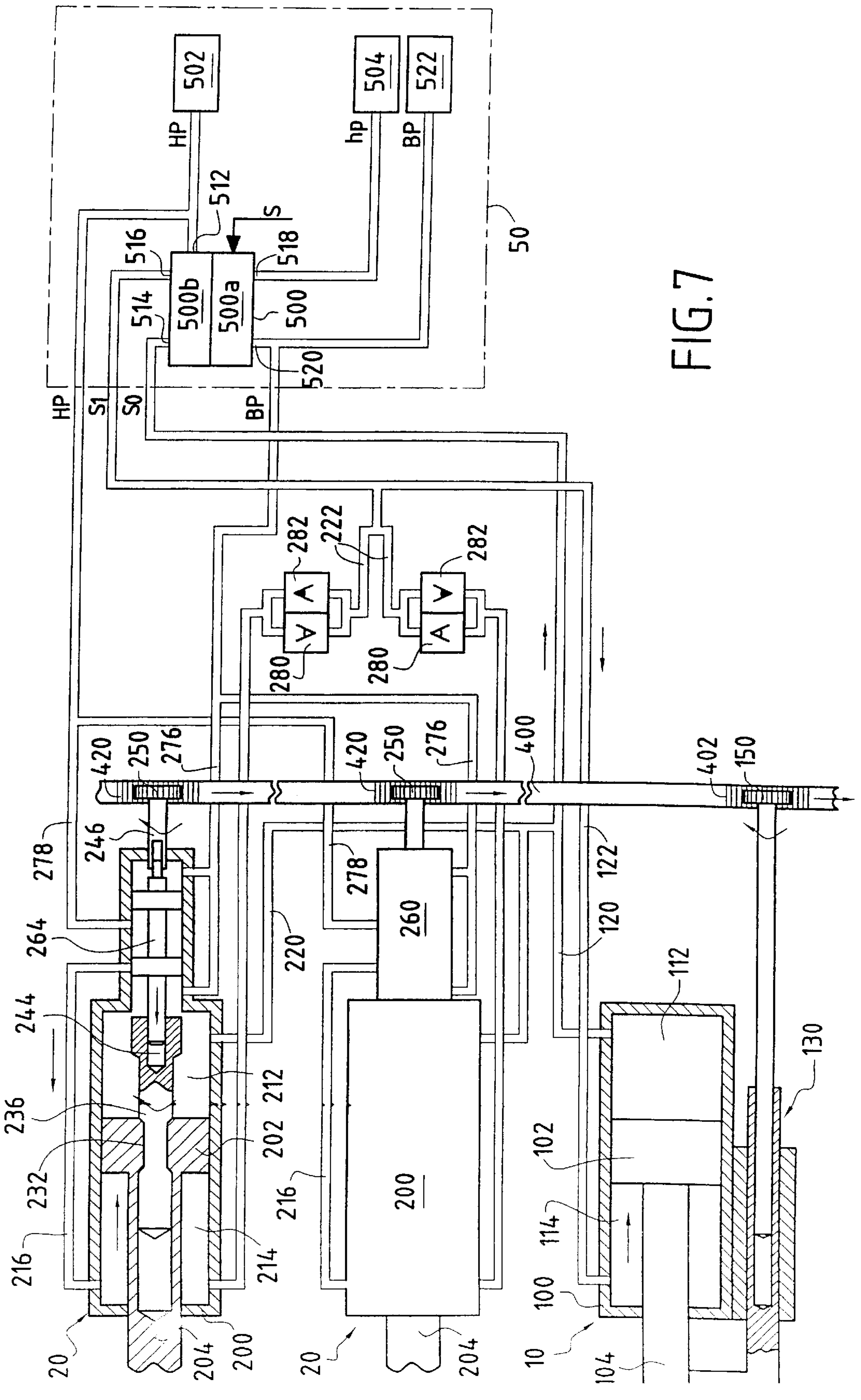
FIG. 7 is a diagram showing the operating principle of the FIG. 1 assembly.

In FIG. 7, the arrows show the displacements of the parts and of the fluid due to retraction of the piston 104 of the master actuator, with all of the screw pitches being "right-handed".

Thus, the actuator assembly in accordance with the invention is remarkable in that the mechanical transmission device which transfers the displacement of the master actuator is not itself exposed to high levels of force. This transmission device transfers the displacement of the master actuator to a control member of a control valve which then acts as a hydraulic amplifier. The slave gearwheel is coupled in rotation with the control rod of the control valve which is not directly engaged with a nut secured to the piston of the slave actuator.

The mechanical transmission device can therefore be lightened considerably compared with devices making use of toothed rings that are mechanically engaged with the pistons of the actuators.

In addition, it suffices to control the pressure in only one of the chambers of the slave actuators by means of a control valve. Although it is possible to devise a system for controlling the pressures in both chambers of the slave actuators by means of respective control valves controlled by the master actuator, that is not necessary.

The use of a flexible linear rolling bearing is advantageous because of its light weight, because of its ability to provide effective mechanical synchronization without any tolerance or thermal expansion effects, and because of its long life. Nevertheless, other mechanical transmission devices meshing with the gearwheels could be used, such as a ring-shaped rack or flexible shafts with wormscrews, and they could be of small dimensions because of the low level of force required for synchronization purposes.

In the above description, an application is described of an actuator assembly in accordance with the invention to controlling the moving flaps of variable-section nozzles.

As already mentioned, the invention is not limited to this application and it may be used for controlling hydraulic actuators for driving moving members other than flaps, providing those members need to be driven synchronously, or indeed for controlling flaps in steerable or "vector" nozzles.

Under such circumstances, the flaps of a steerable nozzle are controlled by at least three actuators, which are synchronized mechanically and associated with two offset devices which are themselves servo-controlled electrically and act on the reference positions of the two corresponding actuators so as to offset them relative to the reference position of the third actuator, thereby enabling the nozzle to be steered.

Figure 8:
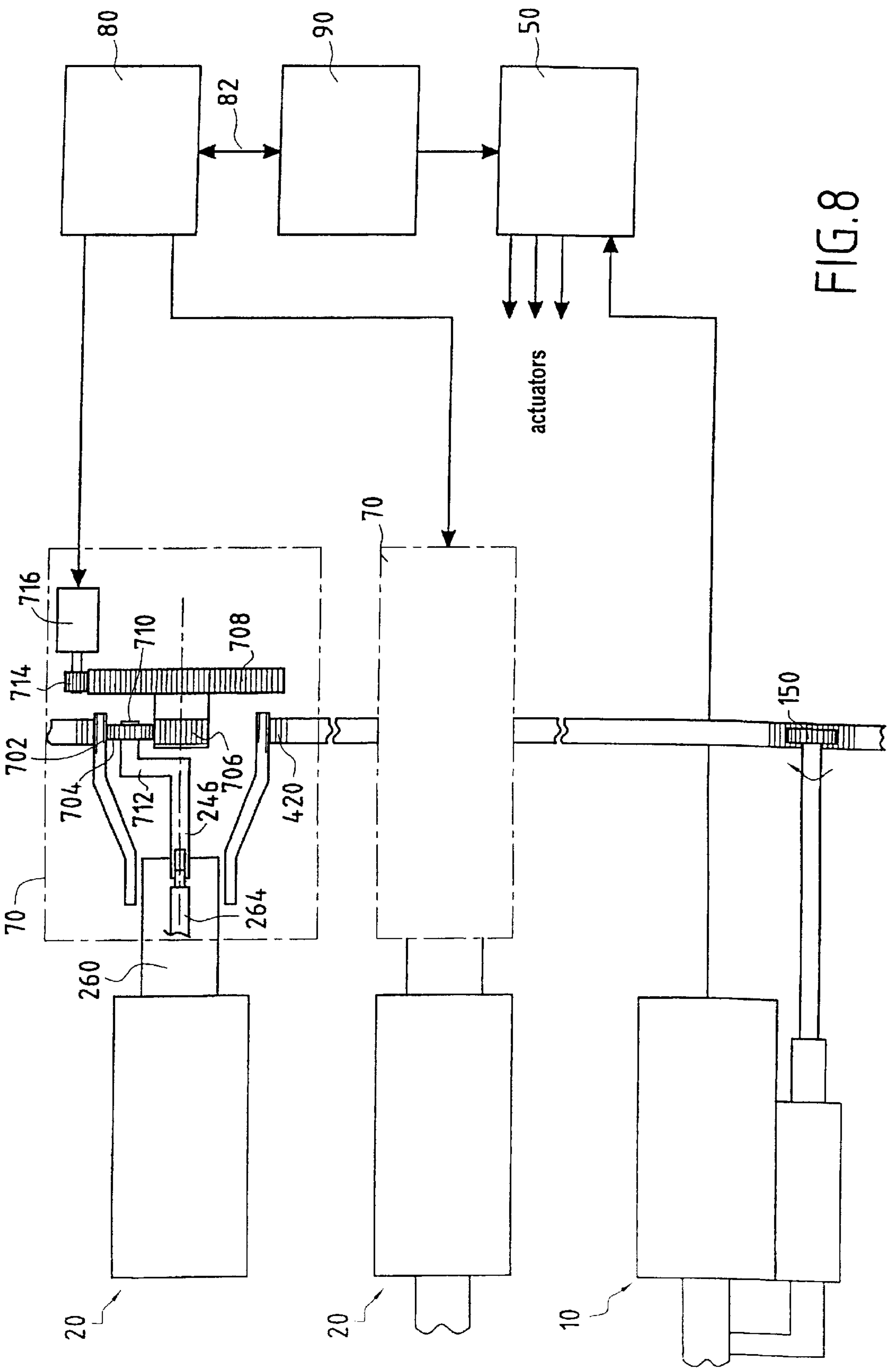
FIG. 8 is a diagram showing an embodiment of an actuator assembly in accordance with the invention for the flaps of a vector nozzle.

An embodiment is shown diagrammatically in FIG. 8. Elements which are common between FIG. 8 and the other FIGS. 1 to 7 are given the same numerical references.

The FIG. 8 actuator assembly comprises a master actuator 10 and two slave actuators 20 with a mechanical transmission device 40 between the master actuator and the slave actuators. The actuators 10, 20, and the transmission device 40 are as described above.

An offset device 70 is interposed between the transmission device 40 and each slave actuator 20. Only one of these offset devices 70 is shown in detail in FIG. 8.

The offset device 70 comprises a toothed ring 702 having the same axis as the rod 264 of the control valve 260 of the corresponding slave actuator. On its outside circumference, the ring 702 meshes with the rack 420 of the transmission device 40.

On its inside circumference, the ring 702 meshes with a planet wheel 704 interposed between the ring 702 and a toothed hub 706 of a sun wheel 708 having the same axis as the rod 264 of the control valve 260.

The gearwheel 704 is mounted to rotate on a rod 710 which is connected via an arm 712 to the rod 246 and co-operates therewith to form a crank, the axis of the rod 710 being parallel to that of the rod 246, but being offset radially therefrom. Thus, unlike the embodiment of FIGS. 6 and 7, the rod 246, engages the rack 420 not via a single slave gearwheel 250, but via the gearwheel 704 and the ring 702.

The wheel 708 is coupled to the outlet shaft 714 of a stepper motor 716. A vector control computer 80 supplies a control signal to the motor 716 so as to impart an angular offset between the rod 246 and the rack 420 by turning the wheel 708 and the gearwheel 704. This angular offset is determined as a function of a nozzle steering reference value given by the flight controls. It should be observed that the very high stepdown ratio form the inlet to the motor 716 in the example shown makes it possible to use an ordinary stepper motor without additional stepdown gearing.

The vector controller is superposed on the control applied to the exhaust section as implemented by a computer 90 which receives from the master actuator 10 information relating to the position of the flap and which provides the hydraulic circuit 50 with the control signals needed to obtain a desired exhaust section by simultaneous action on the flaps by means of the master and slave actuators.

A dialog connection 82 is provided between the computers 80 and 90 in order to optimize the performance of the engine depending on the set points for steering and power.

The use of a synchronization device in according with the invention then provides two significant advantages:

because of the hydraulic amplification in the slave actuators, the electrical servo-controls for offsetting position are associated with the slave actuators and can therefore themselves deliver low levels of power; and in the event of an electrical breakdown in the control system of the nozzle, the assembly returns to the mechanically synchronized actuator configuration, thereby constituting a fail-safe position (the nozzle is not locked at an angle).

What is claimed is:

1. An actuator assembly comprising synchronized hydraulic actuators, the assembly comprising:

a hydraulic control circuit;

a master actuator having a cylinder and a piston defining two chambers inside the cylinder that are connected to the hydraulic circuit;

at least one slave actuator having a cylinder and a piston defining two chambers in the cylinder, at least a first one of which is connected to an outlet of a directional control valve, which control valve is connected to the hydraulic circuit and to a control member whose position determines the pressure in the first chamber of the slave actuator; and a mechanical transmission for transmitting a displacement of the piston of the master actuator to the control member of the control valve associated with the slave actuator in such a manner that the displacement of the piston of the slave actuator is servo-controlled to the displacement of the piston of the master actuator by controlling the position of the control member of the control valve associated with the slave actuator.

2. An assembly according to claim 1, wherein the mechanical transmission comprises a device for converting displacement in translation of the piston of the master actuator into rotary movement of a master gearwheel, a device for transmitting the rotary movement of the master gearwheel to a slave gearwheel, and a device for converting the rotary movement of the slave gearwheel into displacement in translation of a control rod of the control valve associated with the or each slave actuator.

3. An assembly according to claim 2, wherein the device for converting the rotary movement of the slave gearwheel into displacement in translation of the control rod is formed by a first screw-and-nut system in which the screw is carried by the control rod.

4. An assembly according to claim 3, including a second screw-and-nut system for converting a displacement in translation of the piston of the slave actuator acting as a nut into a rotary movement of the screw of the second screw-and-nut system, the control rod and the screw of the second screw-and-nut system being screwed together in such a manner that rotary movements of the control rod and of the screw compensate and the control rod remains stationary in translation so long as the displacement of the piston of the master actuator transmitted to the control rod and the displacement of the piston of the slave actuator are synchronized.

5. An assembly according to claim 2, wherein the or each slave actuator has a first chamber connected to the control valve associated with said slave actuator and a second chamber connected in common with a chamber of the master actuator.

6. An assembly according to claim 2, wherein the control valve associated with the or each slave actuator is a two-outlet valve connected to both chambers of the slave actuator.

7. An assembly according to claim 2, wherein the device for transmitting rotary movement from the master gearwheel to the slave gearwheel is constituted by a flexible linear rolling bearing carrying racks that mesh with the gearwheels.

8. An assembly according to claim 1, in which the pistons of the actuators are connected in common to a control ring, wherein said assembly comprises one master actuator and two slave actuators.

9. An assembly according to claim 8, further comprising at least one additional follower actuator powered by the hydraulic circuit in parallel with the master actuator.

10. An assembly according to claim 1, including a variable offset device interposed between the mechanical transmission and the control member of each slave actuator so as to be able to introduce an offset between a servo-controlled position of the slave actuator and a reference position of the master actuator.

11. An assembly according to claim 2, including a variable offset device interposed between the mechanical transmission and the control member of each slave actuator so as to be able to introduce an offset between a servo-controlled position of the slave actuator and a reference position of the master actuator, and wherein the offset device is an angular offset device between the control member of the slave actuator and a ring meshing with a device for transmitting the rotary movement of the master gearwheel.

12. A turbojet nozzle of variable exhaust section defined by the positions of moving flaps, the nozzle including an assembly according to claim 1 for actuating the moving flaps simultaneously.

13. A turbojet nozzle of variable exhaust section and direction defined by the positions of moving flaps, the nozzle including an assembly according to claim 10 for actuating the moving flaps.

* * * * *